(12) United States Patent  
Salamon

(10) Patent No.: US 8,392,307 B1  
(45) Date of Patent: Mar. 5, 2013

(54) PERFORMANCE-BASED SECURITY SYNDICATION

(75) Inventor: Robert L. Salamon, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 254 days.

(21) Appl. No.: 11/949,873

(22) Filed: Dec. 4, 2007

Related U.S. Application Data

(60) Provisional application No. 60/883,245, filed on Jan. 3, 2007.

(51) Int. Cl.
*G06Q 40/00* (2012.01)

(52) U.S. Cl. .......................... 705/36 R; 705/35; 705/38

(58) Field of Classification Search ................ 705/35, 705/36 R, 38
See application file for complete search history.

(56) References Cited

U.S. PATENT DOCUMENTS

| | | | |
|---|---|---|---|
| 4,642,768 A * | 2/1987 | Roberts | 705/4 |
| 2006/0184446 A1 * | 8/2006 | Ross | 705/37 |
| 2006/0224494 A1 * | 10/2006 | Pinkava | 705/37 |

* cited by examiner

*Primary Examiner* — Muriel Tinkler

(74) *Attorney, Agent, or Firm* — Hunton & Williams LLP

(57) ABSTRACT

A technique by which a bank assists a company in raising capital is disclosed. The technique allows a company to issue financial instruments that share characteristics of both debt and equity. Moreover, the technique includes the bank creating and marketing such instruments.

26 Claims, 3 Drawing Sheets

PERFORMANCE-BASED SECURITY SYNDICATION

PRIORITY

The present application claims priority to and incorporates by reference in its entirety U.S. Provisional Patent Application No. 60/883,245 entitled "Performance-Based Security Syndication" to Salamon.

FIELD OF THE INVENTION

The present invention generally relates to a technique for raising capital for a company. More particularly, the invention relates to a technique for syndicating a financial instrument, the payout of which is based on the performance of a company.

BACKGROUND OF THE INVENTION

In general, there are two primary ways for a company to raise capital: by selling debt, such as bonds, and by selling equity, such as stocks. An advantage of debt is that the interest that a company pays to the bond holder is tax deductible. Accordingly, debt would at least superficially appear to cost a company less than equity.

However, this naïve view is not borne out in practice because, from the issuing company's perspective, debt incurs a larger cost of risk (e.g., for liquidity risk) than equity. A company generally must pay out on its bonds at set periods and for set amounts. Thus, issuing debt locks a company into providing fixed payments at set times in the future. This can be disadvantageous when a company experiences a temporary shortage of cash liquidity. In the worst case scenario, over-reliance on debt can cause a cash-flow crisis for a company, causing its lenders to call in their loans and forcing the company into bankruptcy.

On the other hand, equity, such as stock, is generally less risky than debt, from the issuing company's perspective. This is because stock does not require the issuing company to pay fixed amounts at fixed times. For example, stock dividends are typically payable at the company's exclusive option. Thus, although equity is generally not tax deductible, it has its place in raising capital for a company because it is more forgiving of a company suffering temporary cash shortages. In practice, most companies choose to raise capital by issuing both debt and equity.

From an investor's perspective, equity is more risky than debt. As explained above, debt pays out at fixed times and in fixed amounts. Unless the issuing company goes bankrupt, it must pay on its issued debt (and sometimes a company must pay on its debt even though it has declared bankruptcy). On the other hand, with the increased risk (to the investor) of equity comes the potential for increased rewards (again, to the investor). Stocks prices are not capped; indeed, stock prices can radically increase, and the issuing company can pay dividends. Thus, an investor can potentially receive much greater return on investment when investing in equity as compared to debt. Of course, the same investor runs the risk that equity can greatly diminish in value; this risk is much greater for equity than it is for debt.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

Certain embodiments of the present invention raise capital for a company through an instrument that includes benefits of both debt and equity. For example, some embodiments provide a financial instrument whose payouts may be tax deductible by the issuing company while at the same time reducing the risk to the company that it must pay out an inordinate amount of money when it is temporarily low on cash. Some embodiments also provide advantages to the investor in that they guarantee a baseline payout amount while allowing the investor to enjoy an upside on the investment should the issuing company perform well. These and other advantages are explained in detail herein.

Figure 1:
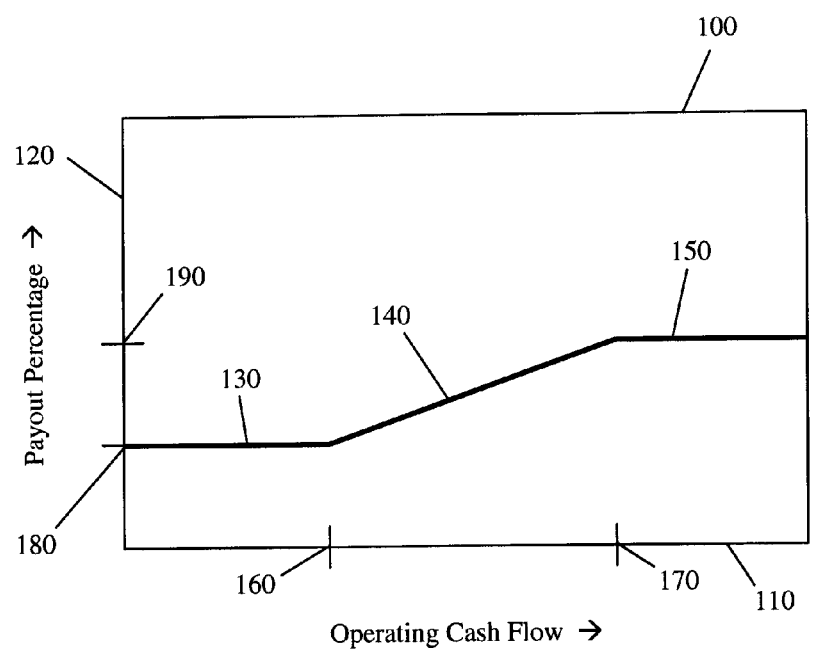
FIG. 1 is a payout diagram for a financial instrument according to an embodiment of the present invention.

FIG. 1 is a payout diagram for a financial instrument according to an embodiment of the present invention. In particular, FIG. 1 illustrates payout amounts that an investor receives if that investor owns a financial instrument according to some embodiments of the present invention. It is important to note that, as discussed in relation to FIGS. 2 and 3, the present invention is not limited to paying out on such a financial instrument. Rather, some embodiments of the present invention encompass an at least partially computer-based technique by which a bank assists a company in raising capital by offering for sale (or otherwise providing) financial instruments as described in relation to FIG. 1.

As illustrated in FIG. 1, payouts for an exemplary financial instrument are tied to the operating cash flow of the issuing company. Operating Cash Flow ("OCF") according to this embodiment is defined as Generally Accepted Accounting Principles Operating Income plus Depreciation and Amortization. Operating Income is defined as Earnings Before Interest and Tax ("EBIT"). Thus, OCF according to this embodiment is defined as EBIT plus Depreciation and Amortization ("EBITDA"). OCF is a proxy for the cash generated by a company over a given time period. Generally, OCF measures the solvency of a company. By tying payouts of a financial instrument to OCF, certain embodiments of the present invention allow investors to invest directly in the performance of a company. That is, such embodiments allow investors to participate in the company's cash flow.

An investor purchases an instrument according to an embodiment of the present invention for a purchase price. The financial instrument is further associated with a principal amount, also called a "face value." In certain embodiments, the purchase price may be less than the principal (e.g., the embodiment of FIG. 2); in other embodiments, the purchase price may be equal to the face value (e.g., the embodiment of FIG. 3). Possible principal amounts include, by way of non-limiting example, $100, $1000, $5000, $10,000, $25,000, or $100,000. The term of the financial instrument is typically sixty (60) years, however, other terms, such as by way of non-limiting example, fifty (50) years, ten (10) years, and less than ten (10) years are also possible. At the end of the term, the investor receives the principal.

The exemplary financial instrument of FIG. 1 has an associated principal of $1000. Thus, in this example, sixty years after purchasing the financial instrument, the investor receives $1000.

In addition, at periodic intervals, yearly in this example, the investor receives a payoff tied the company's OCF as illustrated in FIG. 1. Other intervals are also possible, such as, by way of non-limiting example, quarterly or twice annually. At the end of each period (at the end of each year in this example), the company's OCF is measured for the preceding period (year, in this example). The OCF is associated with a payout percentage according to the curve 130, 140, 150 of FIG. 1. The investor then receives the associated percentage of the financial instrument's principal for that period. That is, the OCF's position on the x-axis 110 determines a corresponding payout percentage on the y-axis 120, and each periodic payout is calculated as that percentage of the face value of the instrument.

The curve 130, 140, 150 of FIG. 1 is set forth as follows. The x-axis 110 corresponds to measured OCF, and y-axis 120 corresponds to payout percentage as discussed above. The first segment of the curve, 130, runs from an OCF of zero to a floor value OCF 160. Segment 130 corresponds to a baseline percentage 180. Thus, if the OCF for a given year is anything less than the floor amount 160, the investor receives the baseline percentage 180 of the face value of the financial instrument.

Segment 150 represents any OCF above a ceiling amount 170. This range of OCF values corresponds to a maximal payout percentage 190. Thus, if the OCF measured for the year is above ceiling amount 170, then the investor receives the maximal percentage 190 of the financial instrument's principal.

Segment 140 is associated with measured OCF values that lie between the floor amount 160 and the ceiling amount 170, inclusive. Segment 140 represents payout percentages that increase as OCF increases. That is, segment 140 represents a payout that is an incremental percentage of the principal, pro-rated according to the measured OCF.

By way of non-limiting example, an algebraic formula for segment 140 may be represented as follows. Let the floor amount 160 be represented as "X", the ceiling amount be represented as "Y", the baseline percentage be represented as "A", and the maximal percentage be represented as "A+Z". Then the formula for segment 140 is given as, by way of non-limiting example, $P=A+[Z(OCF-X)/(Y-X)]$, where OCF is represented on the x-axis, and the payout percentage, P, is represented on the y-axis. Other formulas for segment 140 are also possible, including discontinuous, discrete, piecewise continuous, and non-linear formulas.

The following represents a payout determination for a specific choice of parameters. These parameters are meant to be exemplary only; other values are possible. Let the principal amount be $1000, the floor amount be X=$1B (one billion dollars, or $1,000,000,000), the ceiling amount be Y=$2B, the baseline percentage be A=5%, and the maximal percentage be A+Z=15% (so Z=10%). The formula for segment 130, when OCF is less than $1B, is given by P=5%. The formula for segment 150, when OCF is greater than $2B, is given by P=15%. And the formula for segment 140 is given by P=5%+10% (OCF−$1B)/$1B. The periodic payoff occurs yearly in this example.

With the above parameters, if OCF is measured at, for example, $5,000,000, then the payout is determined by segment 130 as 5% of the face value of the instrument, or 5%×$1000=$50. The investor would be paid $50 for that year. If the OCF for the year is measured at $10B, for example, then the payout is determined by segment 150 at 15% of the principal, or 15%×$1000=$150. Thus, for these parameters and in this specific non-limiting example, the yearly payoff on a $1000 principal instrument must be between $50 and $150, inclusive.

Consider now the case where the OCF is measured at $1.5B for the year. This value lies between the floor value and the ceiling value, and therefore the payout percentage is determined by segment 140 according to P=5%+10% ($1.5B−$1B)/$1B=5%+5%=10%. The payout on the $1000 principal for an OCF of $1.5B for these parameters is 10%×$1000=$100. Again, the parameters referred to above are non-limiting and exemplary only; other parameters are possible. Furthermore, the straight-line character of segment 140 is exemplary, other payout curves are embraced within the scope of the present invention.

The instrument whose payout is depicted in FIG. 1 may be callable by the company at any time. That is, the company may choose to buy back the instrument for a make-whole redemption price, which reflects a penalty for the company cashing out early. To encourage the company to call the instrument at a set time, the instrument may include a provision requiring one or more of its baseline percentage and maximal percentage to increase by a certain percentage after that set time. Such shortening of the instrument's duration typically increases its appeal to investors. By way of non-limiting example, the instrument may include a provision by which the baseline payout percentage A (and therefore the maximal percentage A+Z) increases by 0.5% after ten years.

The instrument may include a provision whereby the company is allowed to defer payouts at its option. For example, the instrument may allow the issuing company to defer its scheduled payouts for up to ten years and then pay the deferred payouts on a cumulative basis. Other ranges within which the company may cumulatively defer payout are also possible. Deferred payouts may accumulate interest.

An advantages of the instrument discussed in relation to FIG. 1 include that its payouts are tied to the company's OCF rather than market perceptions of the company's performance. Such perceptions are subjective and may be totally unrelated to the company's actual financial health. OCF, on the other hand, provides an objective measure of the vitality of the company. Thus, the instrument under discussion disaggregates public valuation from business performance. The instrument provides the opportunity to invest in a company's performance, yet be guaranteed a minimal return on the investment, namely the baseline percentage payout. For an investor who would otherwise invest in equity, such an instrument provides the upside potential associated with equity together with the safety net of the baseline percentage payout, which is normally lacking in pure equity instruments.

Another advantage of instrument described in relation to FIG. 1 is that while it provides for the possibility of upside payments, it has essentially the same risk profile as junior subordinated debt. In certain embodiments, the instrument is senior in claims to both preferred and common stock (e.g., upon bankruptcy, the company's assets will pay on such an instrument before they pay on preferred or common stock). Thus, the instrument may have essentially the same risk profile as certain types of bonds. However, bonds typically pay out or accrue pre-determined fixed coupons, which do not vary according to the success of the issuing company. The instrument of FIG. 1 shares the lower-risk advantage of bonds while providing a return on the investment that increases with the company's OCF. That is, the instrument is lower-risk, like a bond, yet provides the possibility of a performance reward similar to stock. For an investor that might otherwise invest in debt, the present instrument provides the lower-risk associated with debt together with the opportunity for an upside payout, which is normally lacking in pure debt instruments.

Figure 2:
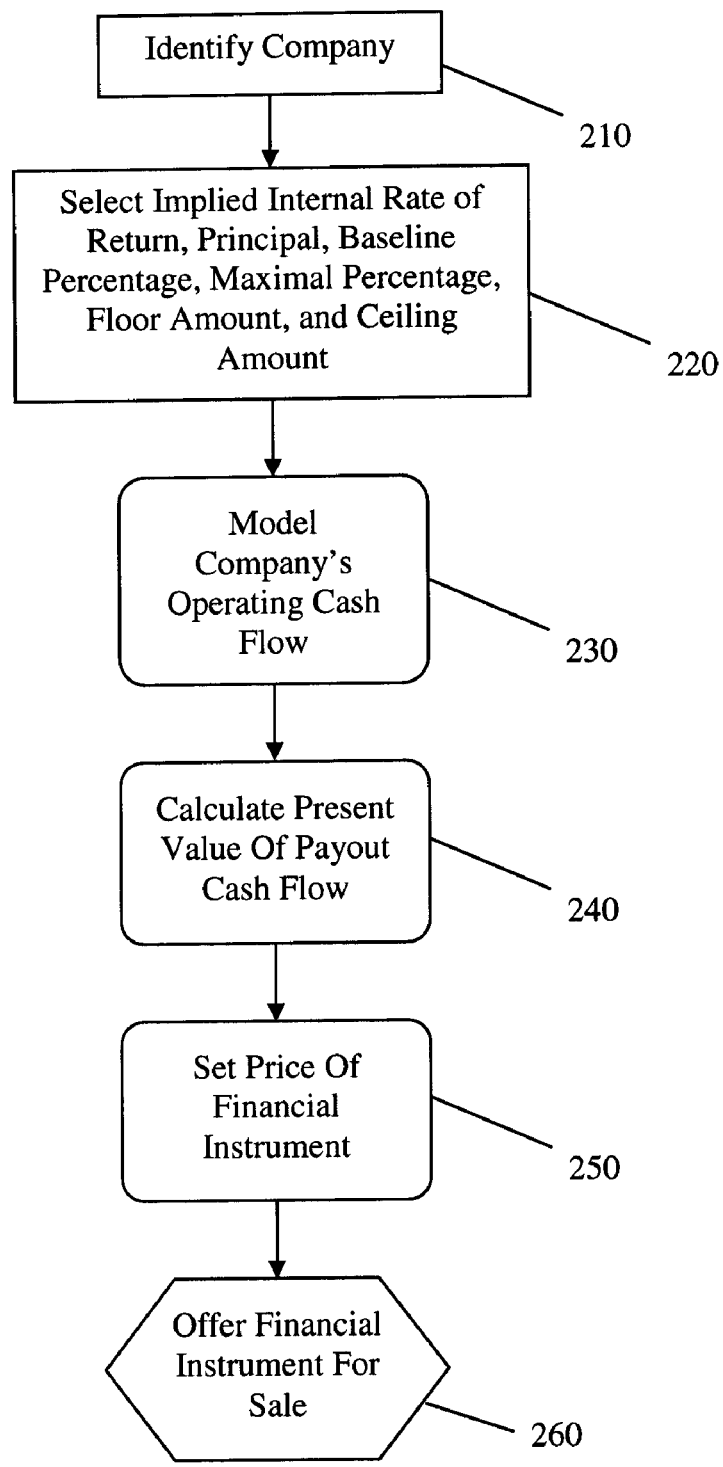
FIG. 2 is a flowchart depicting an embodiment of the present invention.

FIG. 2 is a flowchart depicting an embodiment of the present invention in which the associated financial instrument has a price that is less than the principal in order to account for the time-value of money. This embodiment focuses on the investment bank's role in assisting a company obtain capital by creating instruments of the type described above in relation to FIG. 1. This process is generally referred to as "syndication." ("Syndication" may refer to the activities of one or more banks.)

The first step in the embodiment of FIG. 2 is for the bank to identify 210 the company that wishes to obtain capital. This typically occurs when the bank's origination team discusses the company's needs for financing and works out that the company would benefit from issuing the type of instrument described in relation to FIG. 1. Although the bank can contact the company or vice-versa, typically the bank and company have an ongoing relationship such that the company turns to the bank for financing ideas.

The bank then begins the task of creating and determining a price for the instruments that the company will issue. This process includes first selecting 220 the parameters that define the instrument. Such parameters include the principal for each instrument, the baseline percentage, the maximal percentage, the floor amount, and the ceiling amount. Each of these quantities is discussed in detail above in relation to FIG. 1. An additional consideration may include choosing the structure of the curve (e.g., 140) that defines the payout percentage when the company's measured OCF lies between the floor amount and ceiling amount. This curve may be defined according to the linear relationship set out above in relation to FIG. 1, may be another linear relationship, or may be non-linear. Such curve may be, by way of non-limiting example, discontinuous, discrete or piecewise continuous.

The bank also selects an implied internal rate of return ("IIRR") for the instruments at step 220. The IIRR is a discount rate used in time-value-of-money calculations. Thus, the bank uses this parameter later in order to calculate the financial instrument's price. The selected IIRR may be a single value, multiple values, or an interval of acceptable values. Two comments are in order regarding the IIRR. First, the term "implied" means that the internal rate of return ("IRR") is determined either by fiat or by a calculation that computes it indirectly. Second, although IRR in general are determined by calculation, a market making entity such as an investment bank can in certain circumstances select an IRR. In the embodiment of FIG. 2, the IIRR is selected by a market-making bank.

The pricing process generally includes three steps: modeling 230 the company's expected operating cash flow, calculating 240 the present value of the cash flow that the company must pay on the instrument as determined by the modeled operating cash flow, and setting 250 the offering price of the instruments. Each of these steps is discussed in detail below.

At step 230, the bank models the company's OCF. That is, the bank estimates what the company's OCF will be for a future period of time. This period may be the entire term of the associated financial instrument, or may be for any initial segment thereof (e.g. the first ten years of a sixty-year term instrument). The modeling (i.e., estimating) may be accomplished by computer, by a human, or by a combination thereof. Typical factors that are taken into consideration in estimating future OCF include parameters taken from the company's existing balance sheets, income statements, and statement of cash flows, each of which is publicly available for publicly-traded companies. Techniques for modeling OCF are known to those of ordinary skill in the art and include, by way of non-limiting example, stochastic processes and Monte Carlo simulations. The particular technique used to model future OCF of the company is not part of the present invention.

The bank then calculates estimated future payouts based on the estimated OCF values. This calculation is based on the parameters selected at step 220 and on the modeled OCF values. Because the payout curve for the instrument (e.g., the curve set out in FIG. 1) defines a mathematical function P( ) that accepts OCF values and outputs payout percentages, each future payout may be calculated as, by way of non-limiting example, $FP(O_t)$, where F is the face value of the instrument and $O_t$ is the estimated OCF value at time t. Step 220 may be performed by a computer, a person, or a combination of both.

At step 240, the bank calculates the present value of all future payouts of the financial instrument according to the modeled future OCF values. That is, once the future estimated payouts are calculated, the bank calculates the present value of those payouts. Step 240 may be performed by a computer, a person, or a combination of both. This step accounts for the fact that a dollar today is worth more than the promise of a dollar a year from now. Calculating the present value of the future payouts of the financial instrument according to the modeled future OCF values may be accomplished by determining the payout associated with each estimated OCF value, then discounting each payout to account for the time value of money using the IIRR selected at step 220, and finally summing together the discounted payouts.

For example, the present value of a payout of $FP(O_t)$ dollars at a future time t, assuming an interest rate of r equal to the IIRR selected at step 220, may be calculated as, by way of non-limiting example, $FP(O_t)e^{-rt}$. Therefore, the present value of a cash flow of such payouts may be calculated as, by way of non-limiting example, $\Sigma_t FP(O_t)e^{-rt}$. Similarly, the present value of the final principal payout may be calculated as, by way of non-limiting example, $Fe^{-rt}$, where F and r are as above and T is the term of the instrument. Accordingly, the present value of the payouts and principle may be calculated as, by way of non-limiting example, $Fe^{-rT}+\Sigma_t FP(O_t)e^{-rt}$. These calculations are exemplary only; other calculations of the present value of the estimated payout cash flow may be used within the scope of the present invention. Furthermore, some embodiments calculate the present value of only a portion of payouts, such as an initial segment of the totality of payouts available from the instrument.

At step 250, the bank sets the price of the financial instrument based on the present value of the estimated payouts as calculated at step 240. In the embodiment of FIG. 2, the price is set as the present value of the payouts plus the present value of the final principal payout plus a markup. The markup may account for one or more of the value added by the bank and a premium collected by the company. Thus, the price may be set at, by way of non-limiting example, $M+Fe^{-rT}+\Sigma_t FP(O_t)e^{-rt}$, where M represents the markup. Other techniques may be used, such as, by way of non-limiting example, the bank extracting a percentage of the principal from a purchase price that does not include a markup.

At step 260, the bank offers the financial instrument for sale. The sale may be to a hedge fund or any other investor entity. Such entities include, by way of non-limiting example, individuals, financial institutions, hedge funds, mutual funds, corporate entities, and governmental entities. One or both of the offer and sale may be on a public market, such as by way of non-limiting example, the New York Stock Exchange, NASDAQ, or publicly-accessible hedge funds.

Figure 3:
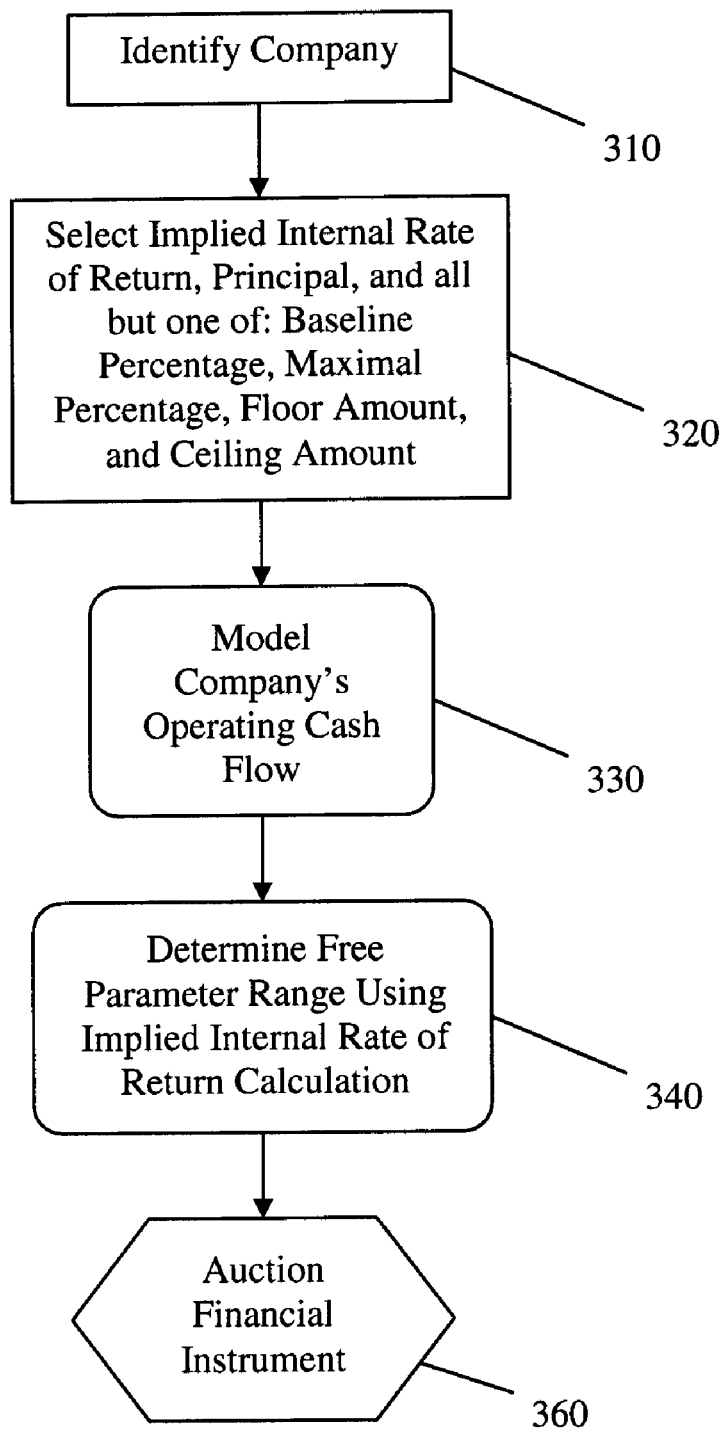
FIG. 3 is a flowchart depicting an embodiment of the present invention.

FIG. 3 is a flowchart depicting an embodiment of the present invention in which the price of the associated financial instrument is equal to its principal. In this embodiment, the bank uses the market to determine one of the financial instrument's parameters in an auction, as discussed in detail below. Like the embodiment of FIG. 2, the embodiment of FIG. 3 is generally directed to the bank syndicating financial instruments in order to assist a company in obtaining capital.

At step 310, the bank identifies the company that it will assist. This step is essentially identical to step 210 of FIG. 2.

At step 320, the bank selects a principal and an IIRR as in step 220 of FIG. 2. In contrast with the embodiment of FIG. 2, however, the embodiment of FIG. 3 selects all but one of the remaining parameters. That is, the bank selects values for all but one of: the baseline percentage, the maximal percentage, the floor amount and the ceiling amount. The parameter for which the bank does not select a value at this step is referred to as the "free parameter." The remaining parameters are referred to as "fixed parameters."

At step 330, the bank models the company's OCF. This step is essentially identical to step 230 of FIG. 2.

At step 340, the bank determines one or more values for the free parameter. This step involves using a typical calculation for IRR in order to solve for the free parameter. Thus, step 340 includes calculating the payout cash flow based on the OCF modeled at step 330. The payout cash flow and the IIRR selected at step 320 are then used to back-calculate one or more values for the free parameter. For example, step 340 may include determining, multiple times and for multiple free parameter values, a present value of the payout cash flow. That is, for the fixed parameter values and for the one or more IIRR selected at step 320, a computer may calculate one or more present values of the payout cash flow. These present values are then compared with the principal in order to determine which free parameter values satisfy the typical IRR calculation. Thus, at step 340, a computer determines free parameter values that make the present value of the payout cash flow equal (or nearly equal) to the principal amount. Such values may be a collection of discrete values or an interval of values.

At step 360, the bank auctions the financial instruments on a market. Instead of auctioning based on price, which in this embodiment is fixed and equal to the principal, the bidders bid on values of the free parameter. The bank first makes available a term sheet listing all of the parameters selected at step 320 except the IIRR and the free parameter. The term sheet instead lists the free parameter values determined at step 340. Such values may be a finite set of discrete values or an interval of values. At the auction, interested buyers bid on free parameter values, where the winning bidder is allowed to purchase the instruments at their face value (the bank may profit by adding a markup to the sales price or by extracting a percentage of the sales price; other techniques are also possible). The winning bid is generally the bid that corresponds with the lowest payouts on the instrument. Thus, for example, if the free parameter is the baseline percentage, the lowest bid will win. If the free parameter is the ceiling amount, the highest bid will win. The purchased instruments will be based on the selected parameters and on the winning free parameter bid value.

In general, prior to the auction, bidders will conduct their own OCF modeling and payout cash flow estimation based on the parameter values set in the term sheet and on various values of the free parameter. From those quantities, the bidders will calculate an IRR and decide whether they would be willing to purchase the instruments with such an IRR.

An advantage of a company using certain embodiments of the present invention for raising capital relates to the company's debt-to-EBITDA leverage ratio. A bank that loans money to a company is typically allowed to raise its interest rate on the loan if the company shows signs of financial problems. One such sign is a large debt-to-EBITDA ratio. For example, a company that issues $300M in debt in a period where its EBITDA is $100M will have a leverage ratio of 3:1. A bank that holds a loan to such a company will typically raise its interest rate under these circumstances. Ratings agencies (e.g., Standard & Poor or Moody) will likely consider the present instrument to have some percentage of equity credit, for example, 50%. Accordingly, if a company issues $100M of the present instrument and $200M of standard debt in the same period in which its EBITDA is $100M, its debt-to-EBITDA ratio will be counted as (50%×$100M+$200M)/$100M=2.5. Thus, such embodiments naturally reduce the company's debt-to-EBITDA ratio and accordingly reduce the risk of a lending entity raising its interest rates if the issuing company experiences a drop in EBITDA. Another way in which this ratio adjustment is relevant is with respect to pricing the issuer's other securities. Investors often examine credit ratings assigned by ratings agencies in order to decide how much they should pay for a given security. Thus, insofar as the instrument allows a company to raise incremental proceeds without lowering its rating, it facilitates a lower cost of incremental borrowing and easier access to capital. That is, some embodiments of the present invention provide for enhanced equity credit from the ratings agencies.

Another advantage to a company using certain embodiments of the present invention to raise capital is tax deductibility. In some embodiments, the instrument will be viewed as debt by the IRS, for example, when the issuing company is considered investment-grade by the ratings agencies.

In some embodiments of the present invention, the associated financial instruments have a baseline percentage that results in payouts that are lower than comparably-rated bond payouts. Such embodiments account for the price of risk, in that the potential for an upside balances the initially low payout. This feature is advantageous for companies that, for example, have near-term opportunities to invest money in other ventures yet still wish to raise capital immediately. In other words, certain embodiments allow companies to immediately raise capital by selling financial instruments, yet not be burdened with high initial payouts on such instruments. Embodiments that employ financial instruments whose payouts are cumulatively deferrable provide further advantages in that respect.

Some embodiments of the present invention provide advantages to high-yield bond issuers and other companies that are typically at risk for cash flow problems. Because embodiments of the present invention include financial instruments whose payouts rise and fall with the issuing company's OCF, such embodiments provide companies, such as high-yield bond issuers, with a technique for raising capital that has a reduced risk of causing cash-flow crises. That is, when issuers experience a lower-than-desirable OCF, such embodiments of the present invention accordingly reduce the company's payouts, thereby reducing the risk that the cash flow crisis will be compounded by required payouts.

Another type of company that would benefit from raising capital according to embodiments of the present invention are foreign companies that are currently deterred from issuing U.S. equity by the Sarbanes-Oxley laws. Many foreign companies are deterred from issuing U.S. stock by the onerous requirements of the Sarbanes-Oxley laws. Embodiments of the present invention allow such companies to raise capital in the U.S. while avoiding at least some of the Sarbanes-Oxley laws' requirements.

Yet another type of company that would benefit from raising capital using embodiments of the present invention are Real Estate Investment Trusts ("REIT"). REITs are publicly-traded companies that manage real estate portfolios for profit. Because of the way that REITs are regulated, they generally do not retain 90% of their earnings, instead paying out such earnings to investors. Hence, REITs cannot easily build substantial cash balances. Moreover, REITs are capital-intensive businesses. As a consequence, REITs are heavily dependent on the capital markets, and the ratings agencies believe this dependence would prevent REITs from deferring a dividend when prudent. This has resulted in the ratings agencies withholding equity credit on securities issued by REITs when they have granted such credit for similar types of securities issued by standard corporations. Certain embodiments of the present invention, however, do not require that REIT management actively withhold payments when the REIT is under duress. Such embodiments may automatically defer payouts when certain stress conditions are met. In sum, REITs benefit from certain embodiments of the present invention whose associated instruments obtain equity credit from the ratings agencies.

Some embodiments of the present invention provide techniques for high-risk project financing. For example, a company that wishes to branch out into a field that it is not generally associated with would generally desire a technique for financially isolating its high-risk project from the rest of its business. Such a company can issue financial instruments according to certain embodiments of the present invention whose associated payouts are tied to the project's (as opposed to the company's) OCF. This structure reduces risk to investors in the company, because if the project's OCF is low, negative, or zero, the company's payout on the instruments will be at the low baseline percentage. Thus, such embodiments may be used to hedge the earnings volatility associated with high-risk projects. That is, though projects may have volatile earnings, the payouts on the financing instruments are much less volatile, at least because they are, for example, restricted by the baseline percentage and maximal percentage.

Certain embodiments of the present invention include the bank underwriting the instruments. In such embodiments, the bank purchases a block of instruments from the issuing company and then re-sells the instruments on the market. Other embodiments include the company directly selling the instruments on the market. Yet other embodiments include the bank selling the instruments on behalf of the company.

In certain embodiments of the present invention, one or both of the floor amount and ceiling amount are eliminated. Thus, for example, the pro-rated segment 140 of FIG. 1 may extend to the left in place of segment 130, to the right in place of segment 150, or both.

The terminology used herein is for the purpose of describing particular embodiments only, and is not intended to limit the scope of the present invention. Unless defined otherwise, all technical, financial and scientific terms used herein have the same meanings as commonly understood by one of ordinary skill in the art to which this invention belongs. As used throughout this disclosure, the singular forms "a," "an," and "the" include plural reference unless the context clearly dictates otherwise.

I claim:

1. A method of providing funding for a company by syndicating a performance based security, the method comprising:
   modeling, using a computer, an estimated future operating cash flow value of the company;
   calculating, using a computer, a plurality of estimated future payouts based on the estimated future operating cash flow value of the company, each of the estimated payouts comprising:
   a baseline percentage of a principal amount if the future operating cash flow value is less than a floor amount,
   a maximum percentage of the principal amount if the future operating cash flow value is greater than a ceiling amount; and
   the baseline percentage of the principal amount plus a portion of the principal pro-rated according to the future operating cash flow value, if the future operating cash flow value is greater than the floor amount and less than the ceiling amount;
   calculating a present value of the plurality of estimated future payouts; and
   offering for sale a financial instrument based on the present value of the plurality of estimated future payouts.

2. The method of claim 1 further comprising selling the financial instrument to an investor.

3. The method of claim 1, wherein the step of offering comprises publicly offering.

4. The method of claim 3, wherein the step of offering comprises offering on a public market.

5. The method of claim 1 further comprising underwriting the financial instrument.

6. The method of claim 1 wherein the step of calculating comprises choosing a discount rate.

7. The method of claim 1 further comprising selecting an internal rate of return.

8. The method of claim 1, wherein the step of calculating comprises performing an internal rate of return calculation.

9. The method of claim 1 wherein the step of offering comprises offering the financial instrument associated with the company for sale at a price less than the principal.

10. The method of claim 1 further comprising pricing the financial instrument associated with the company based on the present value of the cash flow comprising the plurality of payouts.

11. The method of claim 1 wherein the step of offering comprises offering the financial instrument associated with the company for sale at a price substantially equal to the principal.

12. The method of claim 1 wherein the step of offering comprises auctioning.

13. The method of claim 12 wherein the step of auctioning comprises auctioning based on a parameter selected from the group consisting of: a baseline percentage, a maximal percentage, a floor amount and a ceiling amount.

14. The method of claim 1 wherein the step of calculating comprises calculating a plurality of present values of cash flows comprising a plurality of payouts, wherein each of the plurality of present values of cash flows is based on a different set of values for a baseline percentage, a maximal percentage, a floor amount and a ceiling amount.

15. A method of providing funding for a company by syndicating a performance based security, the method comprising:
   modeling, using a computer, an estimated future operating cash flow value of the company;

calculating, using a computer, a plurality of estimated future payouts, each of the plurality of payouts based on the estimated future operating cash flow value of the company, each of the estimated payouts comprising:

a baseline percentage of a principal amount if the future operating cash flow value is less than a floor amount, a maximum percentage of the principal amount if the future operating cash flow value is greater than a ceiling amount; and the baseline percentage of the principal amount plus a portion of the principal, the portion of the first principal determined as a non-decreasing function of the associated the future operating cash flow value, if the future operating cash flow value is greater than the floor amount and less than the ceiling amount;

calculating a present value of the plurality of estimated future payouts; and outputting the present value of the plurality of estimated future payouts.

16. The method of claim 15 further comprising offering the financial instrument associated with the company for sale.

17. The method of claim 16 wherein the step of offering comprises offering the financial instrument associated with the company for sale at a price less than the principal.

18. The method of claim 16 wherein the step of offering comprises offering the financial instrument associated with the company for sale at a price substantially equal to the principal.

19. The method of claim 16 wherein the step of offering comprises auctioning.

20. The method of claim 19 wherein the step of auctioning comprises auctioning based on a parameter selected from the group consisting of: a baseline percentage, a maximal percentage, a floor amount and a ceiling amount.

21. The method of claim 15 further comprising underwriting the financial instrument.

22. The method of claim 15 wherein the step of calculating comprises choosing a discount rate.

23. The method of claim 15 further comprising selecting an internal rate of return.

24. The method of claim 15, wherein the step of calculating comprises performing an internal rate of return calculation.

25. The method of claim 15 further comprising pricing the financial instrument based on the present value of the cash flow comprising the plurality of payouts.

26. The method of claim 15 wherein the step of calculating comprises calculating a plurality of present values of cash flows comprising a plurality of payouts, wherein each of the plurality of present values of cash flows is based on a different set of values for a baseline percentage, a maximal percentage, a floor amount and a ceiling amount.

* * * * *

UNITED STATES PATENT AND TRADEMARK OFFICE
CERTIFICATE OF CORRECTION

| | | |
|---|---|---|
| PATENT NO. | : 8,392,307 B1 | Page 1 of 1 |
| APPLICATION NO. | : 11/949873 | |
| DATED | : March 5, 2013 | |
| INVENTOR(S) | : Salamon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this
Twenty-sixth Day of August, 2014

Michelle K. Lee
*Deputy Director of the United States Patent and Trademark Office*